United States Patent

[11] 3,576,247

| [72] | Inventors | Donald A. Caulford;<br>Geoffrey A. Fox, Toronto, Ontario, Canada |
|---|---|---|
| [21] | Appl. No. | 834,475 |
| [22] | Filed | June 18, 1969 |
| [45] | Patented | Apr. 27, 1971 |
| [73] | Assignee | Canadian Stackpole Limited<br>Canada |

[54] APPARATUS FOR ORIENTING CONTAINERS
6 Claims, 3 Drawing Figs.

[52] U.S. Cl. ........................................................ 198/33
[51] Int. Cl. ............................................... B65g 47/24
[50] Field of Search ............................................... 198/33
(R2), 131; 214/1 (R)

[56] References Cited
UNITED STATES PATENTS
3,169,629  2/1965  Randrup ...................... 198/33(R2)

*Primary Examiner*—Edward A. Sroka
*Attorney*—Douglas S. Johnson

ABSTRACT: Apparatus for orienting, with respect to its longitudinal seam, a can moving on a conveyor. One end lip of the can is located for rotation in a channel guide on the conveyor, the guide having a throat slightly narrower than the thickness of the junction of the longitudinal seam and the end lip of the can, which junction is thicker than the end lip. The can, while moving, is rotated in the channel guide until the thickened junction is caught in the throat.

INVENTORS
DONALD A. CAULFORD
GEOFFREY A. FOX
BY: DOUGLAS S. JOHNSON
ATTORNEY

INVENTORS
DONALD A. CAULFORD
GEOFFREY A. FOX
BY: DOUGLAS S. JOHNSON

3,576,247

APPARATUS FOR ORIENTING CONTAINERS

FIELD OF THE INVENTION

This invention relates to an apparatus for orienting containers conveyed on a carrier in a moving stream, said containers having an individual common surface characteristic which is used to orient said containers with respect to the direction of travel of a carrier. More particularly the invention relates to an apparatus for orienting body and end-seamed cans conveyed on a carrier in a moving stream so that the body seam will lie in the same plane with respect to the direction of travel of the carrier.

More particularly the invention relates to an apparatus for orienting body and end-seamed cans so that labels can be adhered in the same position with respect to the body seam.

SUMMARY OF THE INVENTION

Seamed cans are formed of a cylindrical body having a longitudinal seam with the result that the can body along this seam is somewhat thicker than the main body of the can. The opposed ends or covers of the can are then seamed—usually double seamed—on to the can body, and it will be appreciated that the increased thickness of the end seam where it joins with the body seam, sometimes known as the "crossover."

This thickness characteristic of a body and end-seamed can is utilized in the invention in order to orient seamed cans so that the body seams will lie in the same plane with respect to the direction of travel of the carrier.

The principal feature of the apparatus in accordance with the invention resides in the provision of individual register units which are conveyed in spaced relation on the carrier, each register unit being formed of a plate having a channel therein which conforms at least to a portion of the circular seamed end of the can, which channel has a restriction which is narrower than the combined thickness of the junction of the body seam and the end seam of the can referred to above as the "crossover."

These individual register units are secured to the carrier, which is preferably a chain link conveyor, and guide means are provided whereby the cans are fed onto the carrier, an end of each can being located in an individual register unit, after which means operate to rotate the can until the thicker junction of the body and end seam encounters the restricted portion in the channel with the result that each can is oriented in the same position on the carrier with respect to the longitudinal body seam.

It will be appreciated from the description hereunder that the invention is equally applicable to the orienting of containers of any type which have the common characteristic of an end lip with a thickened portion.

DESCRIPTION OF THE DRAWINGS

The invention will now be described with respect to the accompanying drawings in which.

DESCRIPTION OF THE PREFERRED EMBODIMENTS

Figure 1:
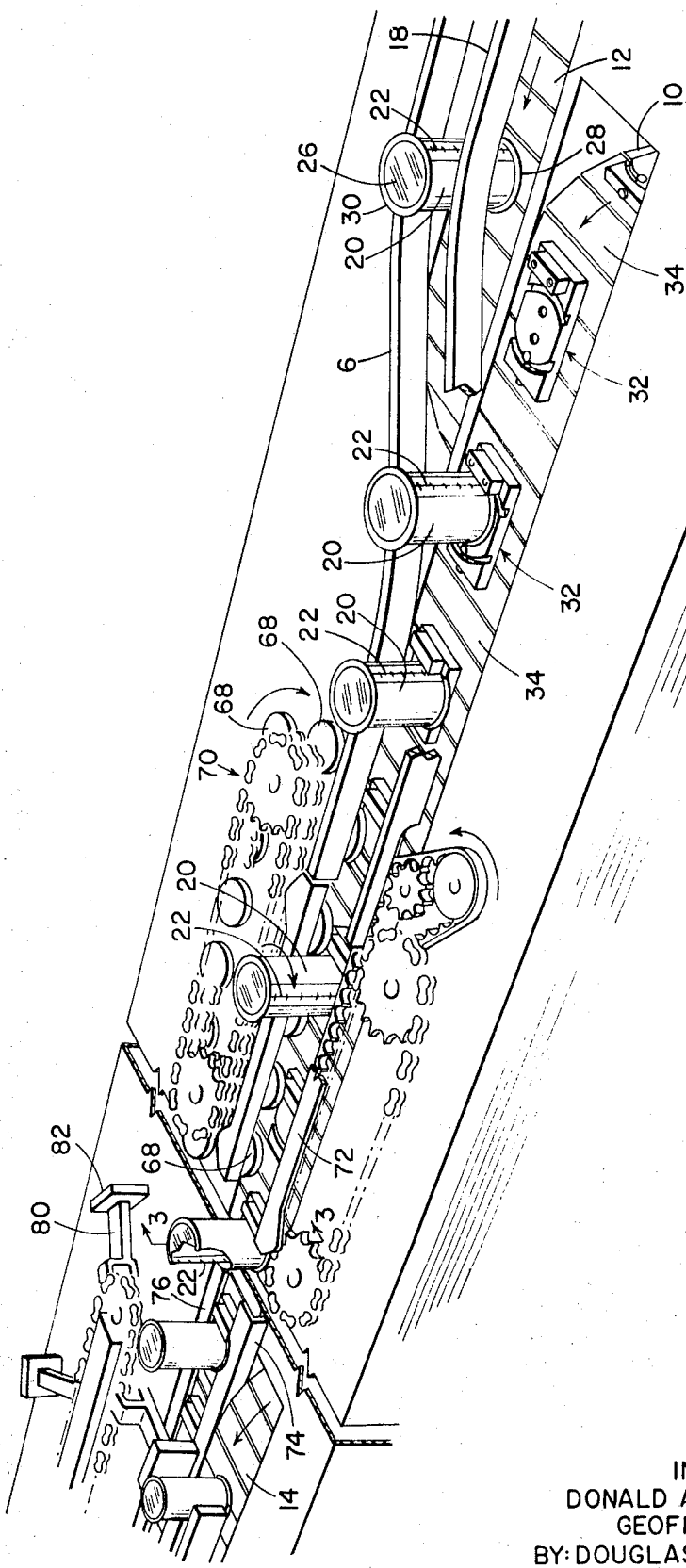
FIG. 1 is a perspective view of a preferred form of the apparatus constructed according to the invention and more particularly illustrates the rotational movement of the can on the individual register unit.

Referring now to FIG. 1, chain link conveyors 10, 12 and 14 are mounted on a suitable base. The conveyor 10 is provided with a guide rail 16 which flares outwardly therefrom as illustrated to form a guide rail for the conveyor 12. Another guide rail 18 on the opposite side of the conveyor 12 is turned inward towards the conveyor 10 crossing over the latter with the result that a can 20 fed along the conveyor 12 is transferred smoothly on to the conveyor 10. Each can 20 has a longitudinal body seam 22 and opposed ends or covers 24 and 26 seamed on to the can body 20 to provide circular lips or chimes 28 and 30.

Figure 2:
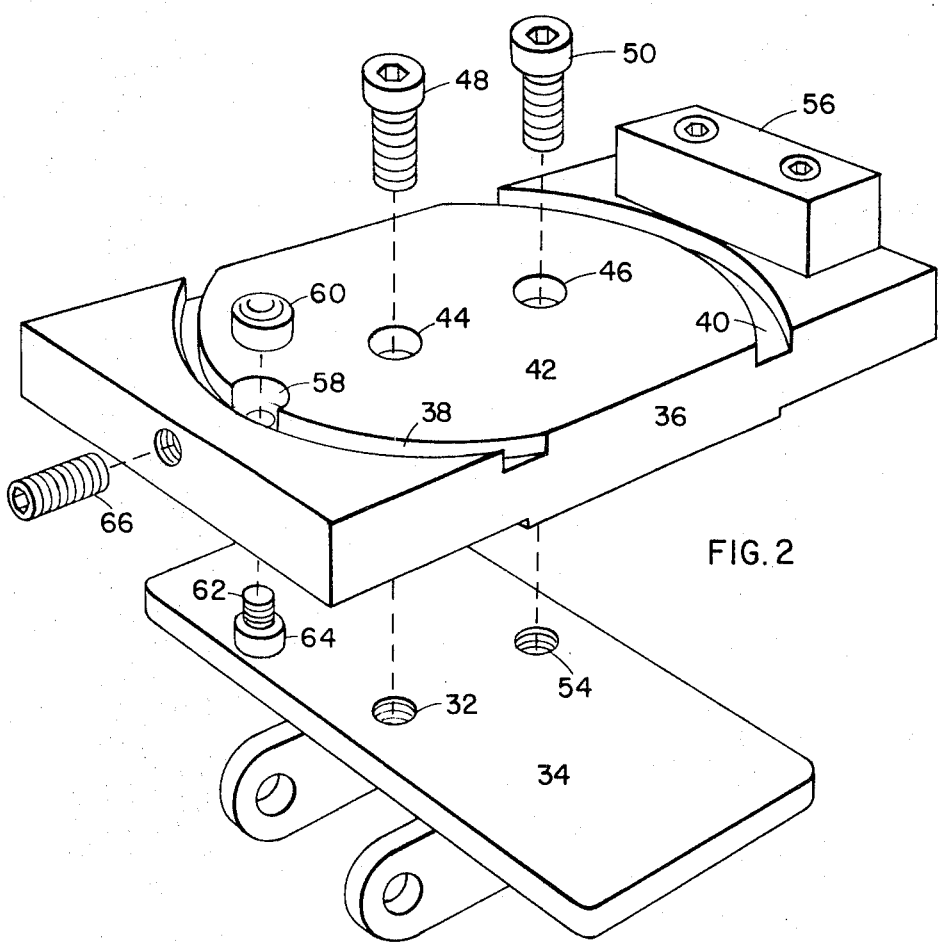
FIG. 2 is an exploded view of the construction of the can register unit.

Individual register units, each generally denoted by the numeral 32, are secured in spaced relation on the chain links 34 of the conveyor 10. A preferred register unit 32 is more particularly shown in FIG. 2. It is formed of a plate 36 into which is machined a pair of arcuate channels 38 and 40 of a width somewhat larger than the thickness of the seam junction of the lip 28 of the end 24 of the can 20. The center portion 42 of the plate 36 is provided with a pair of spaced-apart holes 44 and 46 through which pass recessed head screws 48 and 50, respectively, located in threaded apertures 52 and 54 in the chain link 34 of the conveyor 10.

Figure 3:
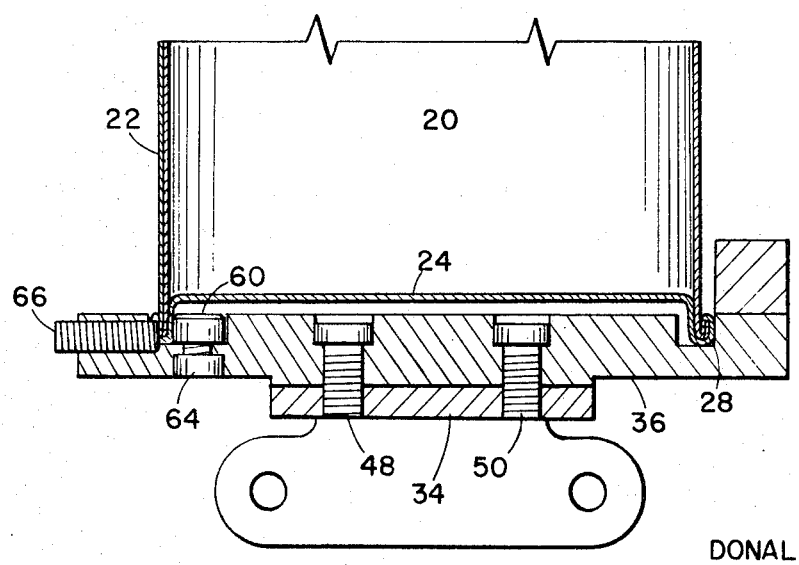
FIG. 3 is a section taken on the lines 3–3 of FIG. 1.

Each register unit 32 has a block 56 secured to or solid with the rear with respect to the direction of travel of the conveyor 10, the block 56 being positioned outside the arcuate channel 40. The block 56 acts as a pusher for the individual can 20 when the end lip 28 is located in the arcuate channels 38 and 40, see FIG. 3.

The arcuate channel 38 has a recess 58 in which is inserted a rotatable cylindrical member 60 carried on the shank 62 of a screw 64 which enters the plate 36 on the underside; the member 60 may be either tapered upwardly or of uniform diameter. The periphery of the rotatable member 60 extends slightly into the arcuate channel 38, thus providing a substantially single-point contact with the interior surface of the lip 28 of the can 20 when it is located in the channel 38.

Opposed to the rotatable member 60 on the opposite side of the channel 38 and entering horizontally into the plate 36 is an adjustable socket set screw 66, the end of which extends into the arcuate channel 38. The end of the socket set screw 66 may be suitably shaped and/or finished to reduce the possibility of abrasion.

The chain link conveyor 10 is provided with means for rotating the cans 20 when they are individually positioned on the can register units 32, such rotating means being more particularly illustrated in Canadian Pat. No. 647,070. In essence the rotating means involves frictional advance of the cans through the peripheral action of wheels 68 extending inwards and over the conveyor 10 and driven by a chain and sprocket arrangement generally denoted by the numeral 70, the wheels 68 bearing the cans 20 against a planar surface which may be stationary or movable.

The operation of the apparatus is more particularly shown in FIG. 1. The cans 20 are fed in spaced relationship from the conveyor 12 on to the conveyor 10 through the action of contoured guide rails 16 and 18, after which each can 20 is transferred to an individual register unit 32 secured to an individual chain link 34 of the conveyor 10. It will be appreciated that in order to effect the transfer, the top surface of the conveyor 12 is at the same level as the top surface of the individual register unit 32 at the point of transfer. It will also be appreciated that a variety of means may be utilized to transfer the cans 20 in requisite spaced relationship so that each is located on an individual register unit 32 at the point of transfer.

Each can 20 on its individual can register unit 32 then enters the portion of the apparatus whereby each can 20 is rotated in the arcuate channels 38 and 40 of the individual register unit 32 through the combined action of the wheels 68 and the planar guide 72 with the result that the position of the longitudinal seam 22 will change. Assuming that the restricted portion in each arcuate channel 38 of each can register unit 32 formed by suitable adjustment of the socket set screw 66 and the rotatable member 60 is in the same line as the direction of travel of the conveyor 10, the thickened junction of the longitudinal seam 22 and the end 24 will be caught in this restriction and the can 20 will no longer rotate. Since each individual can register unit 32 is arranged to have the restricted portion aligned in the same manner with respect to the travel of the conveyor 10, each can 20 will eventually have the longitudinal seam 22 in the same position with respect to each other.

After the orienting has occurred and after the labels have been applied, arrangements are made to remove the cans 20 from the individual register units 32 on to the conveyor 14 for the purpose of subsequently discharging them from the apparatus. A preferred manner of effecting this removal is illustrated in FIG. 1 and involves the provision of a pair of spaced-apart cams 74 and 76 positioned on the conveyor 10; each register unit 32 enters between the cams 74 and 76 so that the individual can 20 rides upwardly out of the channels 38 and 40 in each register unit 32. Once the cans 20 have been lifted out of the register units 32 the cans 20 may be discharged either by inline or lateral movement. A particular arrangement to effect the latter type of discharge is shown in FIG. 1, though other means may be employed; it involves the pushing action of spaced-apart rotating arms 80, the free ends of which each have an individual vertically disposed plate 82 which applies the requisite force to the can 20 to sideways displace it from the conveyor 10. The rotation of the arms 80 is synchronized to correspond with the movement of the can 20 along the conveyor 10, This movement being effected through the action of the block 56. It will be appreciated that to effect smooth transfer the level of the conveyor 14 is the same as the level of the upper surface of the register unit 32.

We claim:

1. Apparatus for orienting a container moving on a carrier, said container having a substantially peripheral end lip with a thickened portion in relation to the remainder of said lip, comprising channel guide means on said carrier adapted to conform to at least a part of said lip thereby providing a guide for rotation of said container when located in said channel guide means, a restriction in said channel means having a width less than said thickened portion, and means for rotating said container in said channel guide means until said thickened portion encounters said restricted portion whereby rotation of the container is halted.

2. Apparatus according to claim 1, wherein said container is a can having a longitudinal body seam and a peripheral end double seam forming said lip, the thickened portion being the junction of said body seam and said end double seam.

3. Apparatus according to claim 1, wherein said channel guide means comprises a plate secured to said carrier, said plate having at least one arcuate channel, and said restriction is formed of a rotatable member in said channel bearing against the inside of said end lip, with adjustable means extending through said plate into said channel and opposed to said rotatable member.

4. Apparatus according to claim 3, wherein said carrier is a chain link conveyor, said plate being secured to one of said links on said conveyor, and means on said conveyor and located at a point thereof after said can thickened portion has been held in said restricted portion to cam said can from said channel means.

5. Apparatus according to claim 4, having means located to the side of said conveyor to remove said can from said conveyor.

6. Apparatus according to claim 3, wherein said plate has an upstanding block thereon positioned at the rear with respect to the direction of travel of said carrier.